United States Patent
Betrancourt et al.

(10) Patent No.: US 11,383,132 B2
(45) Date of Patent: Jul. 12, 2022

(54) PHYSICAL EXERCISE APPARATUS AND METHOD FOR TRAINING ON SUCH AN APPARATUS

(71) Applicant: Inawa Developpement, Ivry-sur-Seine (FR)

(72) Inventors: Alain Betrancourt, Romans-sur-Isère (FR); Ambroise Chaigne, Bressuire (FR); Pauline Malosse, Pont-de-l'Isère (FR)

(73) Assignee: INAWA DEVELOPPEMENT, Ivry sur Seine (FR)

( * ) Notice: Subject to any disclaimer, the term of this patent is extended or adjusted under 35 U.S.C. 154(b) by 0 days.

(21) Appl. No.: 17/294,653

(22) PCT Filed: Nov. 20, 2019

(86) PCT No.: PCT/EP2019/081983
§ 371 (c)(1),
(2) Date: May 17, 2021

(87) PCT Pub. No.: WO2020/104554
PCT Pub. Date: May 28, 2020

(65) Prior Publication Data
US 2022/0040531 A1     Feb. 10, 2022

(30) Foreign Application Priority Data
Nov. 21, 2018 (FR) ...................................... 1871683

(51) Int. Cl.
    *A63B 24/00*      (2006.01)
    *A63B 22/06*      (2006.01)

(52) U.S. Cl.
    CPC ...... *A63B 24/0062* (2013.01); *A63B 22/0605* (2013.01); *A63B 2024/0028* (2013.01)

(58) Field of Classification Search
CPC .............. A63B 21/00; A63B 21/00047; A63B 21/00058; A63B 21/00061;
(Continued)

(56) References Cited

U.S. PATENT DOCUMENTS 4,387,925 A * 6/1983 Barker ..................... B62J 1/005
                                        297/215.15
5,782,639 A * 7/1998 Beal ...................... A63F 13/245
                                          472/130
(Continued)

FOREIGN PATENT DOCUMENTS

DE        10242447 A * 3/2004 ................ B62J 1/28
DE        10242447 A1    3/2004
(Continued)

OTHER PUBLICATIONS

English translation of (WO 2013135697 A1) (Year: 2013).*
(Continued)

*Primary Examiner* — Megan Anderson
*Assistant Examiner* — Thao N Do
(74) *Attorney, Agent, or Firm* — Soquel Group LLC

(57) ABSTRACT

A physical exercise apparatus includes a frame equipped with a crankset and a saddle. The saddle includes a chassis fastened to the frame, two saddle parts, and articulation members for articulating each saddle part relative to the frame around a pitch axis, a roll axis, and a yaw axis. The apparatus includes sensors for detecting a pitch movement, a roll movement, and a yaw movement of each saddle part respectively about the pitch, roll, and yaw axes, these movements resulting from pedaling made by a user. At least one calculation unit determines, from output signals of the sensors, angular amplitudes of the pitch, roll, and yaw movements. At least one screen is provided in order to display, depending on the angular amplitudes determined by (Continued)

the calculation unit, the position on each saddle part of a bearing point of an ischium of a user in the process of pedaling.

11 Claims, 5 Drawing Sheets

(58) Field of Classification Search
CPC ........ A63B 21/00065; A63B 21/00069; A63B 21/00072; A63B 21/00076; A63B 21/00178; A63B 21/00181; A63B 21/00185; A63B 21/00189; A63B 21/00192; A63B 21/00196; A63B 21/002; A63B 21/0023; A63B 21/005; A63B 21/0051; A63B 21/0052; A63B 21/0058; A63B 21/0059; A63B 21/012; A63B 21/0125; A63B 21/015; A63B 21/02; A63B 21/026; A63B 21/027; A63B 21/028; A63B 21/06; A63B 21/16; A63B 21/1681; A63B 21/22; A63B 21/222; A63B 21/225; A63B 21/227; A63B 21/40; A63B 21/4011; A63B 21/4013; A63B 21/4015; A63B 21/4023; A63B 21/4027; A63B 21/4033; A63B 21/4034; A63B 21/4035; A63B 21/4041; A63B 21/4043; A63B 21/4045; A63B 21/4047; A63B 21/4049; A63B 21/0615; A63B 22/00; A63B 22/0002; A63B 22/0005; A63B 22/0007; A63B 22/001; A63B 22/0012; A63B 22/0015; A63B 22/0017; A63B 22/0023; A63B 22/0025; A63B 22/0046; A63B 22/0048; A63B 22/0056; A63B 22/0058; A63B 22/0061; A63B 22/0064; A63B 22/0066; A63B 22/0069; A63B 22/04; A63B 22/06; A63B 22/0605; A63B 22/0664; A63B 22/0694; A63B 22/14; A63B 22/16; A63B 22/18; A63B 22/20; A63B 22/201; A63B 22/203; A63B 22/205; A63B 22/208; A63B 2022/002; A63B 2022/0005; A63B 2022/0028; A63B 2022/003; A63B 2022/0033; A63B 2022/0035; A63B 2022/0038; A63B 2022/0041; A63B 2022/0043; A63B 2022/0051; A63B 2022/0053; A63B 2022/0071; A63B 2022/0074; A63B 2022/0611; A63B 2022/0617; A63B 2022/0623; A63B 2022/0629; A63B 2022/0635; A63B 2022/0641; A63B 2022/0647; A63B 2022/0652; A63B 2022/0658; A63B 2022/067; A63B 2022/0676; A63B 2022/0682; A63B 2022/0688; A63B 2022/206; A63B 23/00; A63B 23/02; A63B 23/0205; A63B 23/0211; A63B 23/0216; A63B 23/0222; A63B 23/035; A63B 23/03508; A63B 23/03516; A63B 23/03525; A63B 23/03533; A63B 23/03541; A63B 23/0355; A63B 23/03558; A63B 23/03566; A63B 23/03575; A63B 23/03583; A63B 23/03591; A63B 23/04; A63B 23/0405; A63B 23/0417; A63B 23/0423; A63B 23/0429; A63B 23/0458; A63B 23/0464; A63B 23/047; A63B 23/0476; A63B 23/0482; A63B 23/0488; A63B 23/0494; A63B 23/08; A63B 23/085; A63B 23/10; A63B 2023/003; A63B 2023/006; A63B 2023/0441; A63B 2023/0447; A63B 2023/0452; A63B 2023/62; A63B 24/00; A63B 24/0003; A63B 24/0006; A63B 24/0021; A63B 24/0062; A63B 24/0075; A63B 24/0087; A63B 2024/0009; A63B 2024/0012; A63B 2024/0015; A63B 2024/0018; A63B 2024/0025; A63B 2024/0037; A63B 2024/004; A63B 2024/0043; A63B 2024/0046; A63B 2024/0065; A63B 2024/0071; A63B 24/0078; A63B 2024/0081; A63B 69/00; A63B 69/0062; A63B 69/16; A63B 2069/161; A63B 2069/162; A63B 2069/163; A63B 2069/164; A63B 2069/165; A63B 2069/166; A63B 2069/167; A63B 2069/168; A63B 71/0619; A63B 71/0638; A63B 71/0641; A63B 71/0644; A63B 71/0647; A63B 71/065; A63B 71/0608; A63B 71/0686; A63B 71/12; A63B 71/1225; A63B 2071/1233; A63B 2071/1241; A63B 2071/125; A63B 2071/1258; A63B 2071/1266; A63B 2071/1275; A63B 2071/1283; A63B 2071/0675; A63B 2071/0677; A63B 2071/068; A63B 2071/0683; A63B 2071/0658; A63B 2071/0661; A63B 2071/0647; A63B 2071/065; A63B 2071/0652; A63B 2071/0638; A63B 2071/0641; A63B 2071/0644; A63B 2225/50; A63B 2230/62; B62J 1/005; B62J 1/007; B62J 1/08; B62J 1/00; B62K 2207/00
USPC .......................................................... 482/8
See application file for complete search history.

(56) References Cited

U.S. PATENT DOCUMENTS

| | | | |
|---|---|---|---|
| 7,494,181 B2* | 2/2009 | Tucker | B62J 1/005 |
| | | | 297/215.14 |
| 9,707,443 B2* | 7/2017 | Warren | A63B 22/0605 |
| D806,177 S * | 12/2017 | Liu | D21/423 |
| D809,810 S * | 2/2018 | Pizarro | D6/354 |
| 10,010,746 B1* | 7/2018 | Hsu | A63B 22/0605 |
| 10,384,736 B2* | 8/2019 | Pizarro | B62J 1/04 |
| 10,392,065 B2* | 8/2019 | Shenkerman | B62H 5/005 |
| 10,618,583 B1* | 4/2020 | Marc | B62J 1/007 |
| 2007/0131031 A1* | 6/2007 | Tsai | G06F 1/3259 |
| | | | 73/514.01 |
| 2009/0233769 A1* | 9/2009 | Pryor | B60K 35/00 |
| | | | 482/8 |
| 2010/0030482 A1* | 2/2010 | Li | A61B 5/1123 |
| | | | 702/19 |
| 2010/0133424 A1* | 6/2010 | Lindsay | G01S 7/4811 |
| | | | 250/237 R |
| 2014/0221158 A1* | 8/2014 | Mabey | A63B 22/0046 |
| | | | 482/4 |
| 2017/0080320 A1* | 3/2017 | Smith | A63B 71/0622 |
| 2017/0312614 A1* | 11/2017 | Tran | G16H 50/20 |
| 2018/0078034 A1* | 3/2018 | Savall | A61B 90/60 |
| 2018/0288586 A1* | 10/2018 | Tran | A61B 5/6804 |
| 2019/0193749 A1* | 6/2019 | Choi | H04W 4/80 |
| 2019/0272432 A1* | 9/2019 | Seko | B60Q 9/00 |
| 2019/0380802 A1* | 12/2019 | Savaii | A61B 17/29 |
| 2020/0020165 A1* | 1/2020 | Tran | G06N 20/10 |
| 2020/0087888 A1* | 3/2020 | Kean | E02F 3/844 |
| 2021/0179227 A1* | 6/2021 | Sintorn | B62K 25/286 |

(56) References Cited

U.S. PATENT DOCUMENTS

FOREIGN PATENT DOCUMENTS

| | | | | | |
|---|---|---|---|---|---|
| EP | 3208183 | * | 8/2017 | ................ | B62J 1/02 |
| EP | 3208183 | A1 | 8/2017 | | |
| WO | 2013135697 | A1 | 9/2013 | | |
| WO | WO-2013135697 | A1 * | 9/2013 | .............. | B62J 1/007 |

OTHER PUBLICATIONS

English translation of DE 10242447 (Year: 2004).*
English translation of 3208183 (Year: 2017).*
INPI Rapport de Recherche Preliminaire for Patent Application No. FR 1871683, Sep. 3, 2019, 2 pp.
International Search Report for Patent Application No. PCT/EP2019/081983, dated Feb. 24, 2020, 2 pp.
EPO Patent Translation of EP3208183, dated Oct. 29, 2019, 15 pp.
EPO Patent Translation of DE10242447, Oct. 29, 2019, 13 pp.
Madgwick, S. O. H., "Estimation of IMU and MARG Orientation Using A Gradient Descent Algorithm," IEEE International Conference on Rehabilitation Robotics, Rehab Week Zurich, ETH Zurich Science City, Switzerland, Jun. 29, 2011, 7 pp.

* cited by examiner

PHYSICAL EXERCISE APPARATUS AND METHOD FOR TRAINING ON SUCH AN APPARATUS

CROSS-REFERENCE TO RELATED APPLICATIONS

This application claims benefit under 35 USC § 371 of PCT Application No. PCT/EP2019/081983 entitled PHYSICAL EXERCISE APPARATUS AND METHOD FOR TRAINING ON SUCH AN APPARATUS, filed on Nov. 20, 2019 by inventors Alain Betrancourt, Ambroise Chaigne and Pauline Malosse. PCT Application No. PCT/EP2019/081983 claims priority of French Patent Application No. 18 71683, filed on Nov. 21, 2018.

FIELD OF THE INVENTION

The present invention relates to a physical exercise apparatus comprising, inter alia, a saddle with two saddle parts capable of pitch, roll and yaw movement relative to a frame. The present invention also relates to a method for training a user on such an apparatus.

BACKGROUND OF THE INVENTION

In the fields of sports training, functional rehabilitation or fitness maintenance for the elderly, it is known, for example from WO-A-2013/135697 to use a proprioception saddle which comprises two saddle parts capable of pitch T, roll R and yaw L movement relative to the frame of a physical exercise apparatus. Before the user begins pedaling, a health care professional or trainer can adjust the exercise machine a priori, taking into account the user's body measurements and, possibly, pathology. Depending on the user's build, it is not easy to check that the latter is correctly seated on the saddle because the pelvis and thighs hide the saddle. It is thus uncertain whether the user's posture on the exercise machine is correct. If the user's posture is not correct, he or she may not benefit fully from the exercise and may even generate an additional pathology through misuse. Moreover, the possible progress of the user during successive exercise sessions cannot be quantified.

SUMMARY OF THE INVENTION

The invention intends to rectify these drawbacks more particularly by proposing a new physical exercise apparatus that makes it possible to ensure that the user is correctly positioned on the saddle and makes it possible to detect any progress made by the user, in particular the progress in his/her pelvic flexibility.

To this end, the invention relates to a physical exercise apparatus comprising a frame equipped with a crankset and a saddle, this saddle itself comprising a chassis fastened to the frame, two saddle parts and means for articulating each saddle relative to the chassis about a pitch axis, about a roll axis and about a yaw axis. According to the invention, the apparatus also comprises sensors for detecting a pitch movement T, a roll movement R and a yaw movement L of each saddle part about the pitch, roll and yaw axes, respectively, these movements resulting from a user pedaling. The apparatus also comprises at least one calculation unit configured to determine the angular amplitudes of the pitch, roll and yaw movements T, R and L from the sensor output signals, and of the position of the bearing point of an ischium on each saddle part. Finally, this apparatus comprises at least one screen for displaying the position on each saddle part of a bearing point of the user's ischium while pedaling, depending on the angular amplitudes determined by the calculation unit.

Thanks to the invention, the user or the person assisting him/her, in particular a health professional or a trainer, is able to evaluate whether his/her posture on the saddle of the physical exercise apparatus of the invention is correct, by locating on the display screen the position of the support points of his/her ischia while pedaling. This allows the user or the person assisting him/her to possibly modify the user's posture in order to correct an asymmetry or an imbalance of his supports. In addition, the apparatus of the invention may allow, possibly by keeping track of the parameters determined by the calculation unit, to compare these parameters from one exercise session to another or during the session, in order to evaluate the user's possible progress.

According to advantageous but non-mandatory aspects of the invention, such a physical exercise apparatus may incorporate one or more of the following features, taken in any technically permissible combination:

The detection sensors comprise at least one inertial cell attached to each saddle part.
  The inertial cells detect pitch and roll movements and at least one optical sensor is used to detect the yaw movement of each saddle part.
  The calculation unit is configured to determine a deviation between the position of each bearing point on the saddle part and a reference position and the screen is configured to show this deviation.
  The screen is positioned in front of the user sitting on the saddle, preferably on a handlebar of the apparatus.

According to another aspect, the invention relates to a method for training a user on a physical exercise apparatus as mentioned above, with this method comprising the steps of:

a) detecting the pitch T, roll R and yaw L movements by means of sensors;
  b) determining the angular amplitudes of the pitch, roll and yaw movements; and
  c) displaying the positions of the ischium support points on the screen, depending on the angular amplitudes determined by the calculation unit.

This method facilitates verification of the user's posture and possible correction thereof, taking into account the data displayed on the screen.

According to advantageous but non-mandatory aspects of the invention, this method may incorporate one or more of the following features:

Inertial cells detect pitch and roll movements, at least one optical sensor is used to detect the yaw movement of each saddle, and step b) comprises the following sub-steps:
  b1) calculating approximate pitch and roll amplitude values, preferably by a 6-axis Madgwick algorithm, based on vector components of the pitch and roll movements determined by the inertial cells;
  b2) calculating vector components corresponding to a magnetometer output signal, based on the output signal of the optical sensor and the approximate values calculated in sub-step b1);
  b3) calculating pitch, roll and yaw amplitude values, preferably by a 9-axis Madgwick algorithm.
  In step c), the screen also displays the angular amplitudes determined in step b).
  The method comprises the additional steps of:

d) determining a single symbol (588) representing the angular amplitudes (α, β, γ), with each angular amplitude (α, β, γ) corresponding to a respective dimension of said symbol;

e) displaying the symbol determined in step d) on the screen (29).

The calculation unit is configured to determine a deviation between the position of each bearing point on the saddle part and a reference position, the screen is configured to display this deviation, and, in step c), the screen displays a representation of the saddle parts, the ischium support positions relative to the representation of the saddles, and a representation of the reference position relative to the representation of the saddles.

BRIEF DESCRIPTION OF THE DRAWINGS

The invention will be better understood and other advantages thereof will become clearer in the light of the following description of an embodiment of a physical exercise apparatus and method for training in accordance with the outline thereof, given by way of example only and made with reference to the appended drawings in which.

DETAILED DESCRIPTION OF EMBODIMENTS

Figure 1:
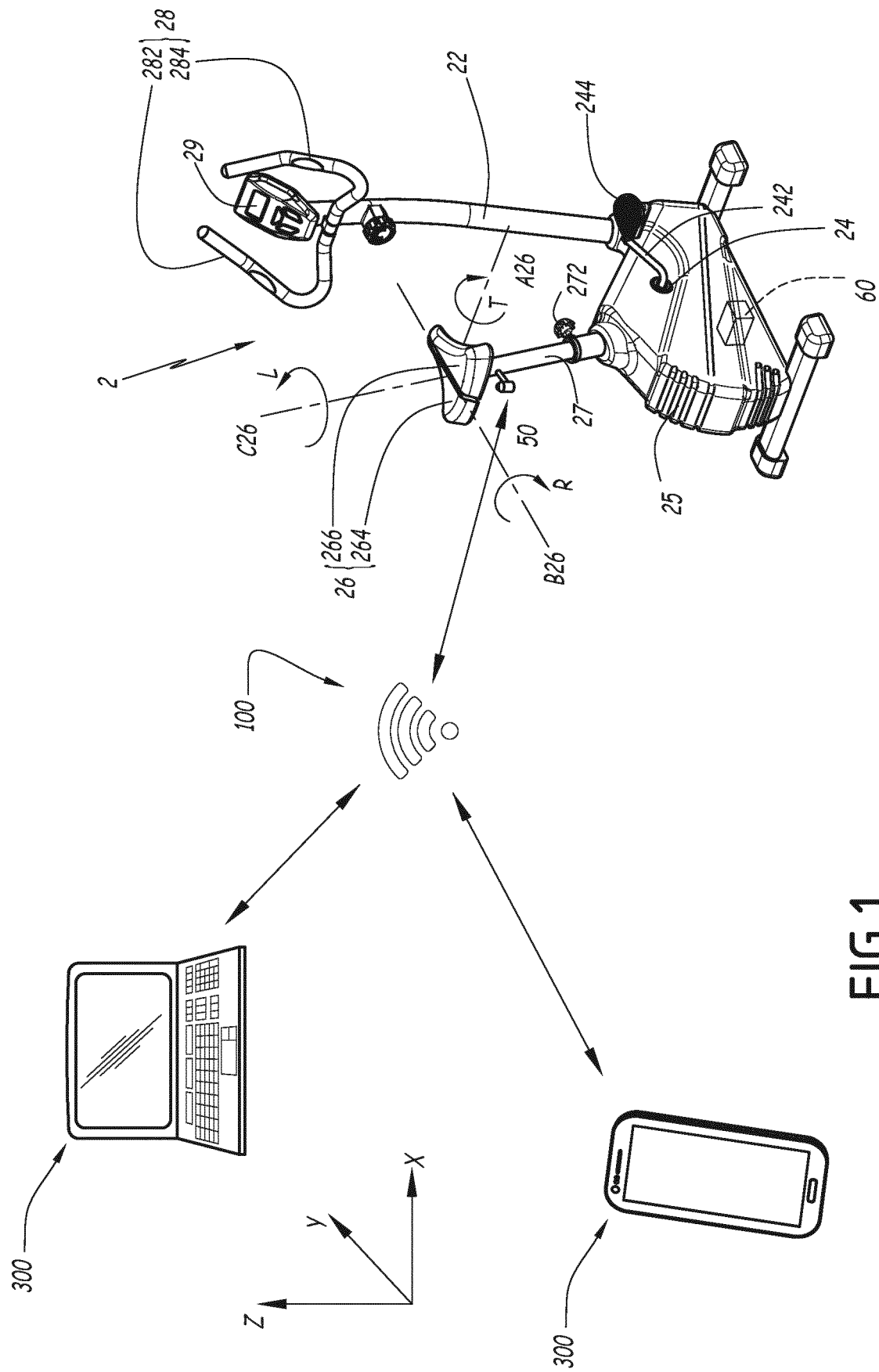
FIG. 1 is a schematic representation of the principle of a physical exercise apparatus in accordance with the invention.

The apparatus 2 shown in FIG. 1 is intended to allow a user to perform physical exercise by pedaling, thereby improving pelvic mobility and/or maintaining or even developing cardiovascular capabilities.

The apparatus 2 comprises a frame 22 equipped with a crankset 24 and which supports a saddle 26 as well as handlebars 28, according to a known breakdown for an exercise bike. The apparatus 2 is of the exercise bike type.

The crankset 24 comprises two cranks and two pedals, with only one of these cranks and one of these pedals being visible in FIG. 1, with references 242 and 244 respectively.

A braking system for the crankset 24, not shown and adjustable, is provided, inside a cover 25, in order to allow modulating the effort that a user must exert to pedal, depending on the exercise to be performed.

The saddle 26 is supported by a seat post 27 mounted in an adjustable manner on the frame 22 and immobilized thanks to a tightening screw, not shown, controlled by a knob 272.

A screen 29 is mounted on the upper part of the frame 22, between the two branches 282 and 284 of the handlebars 28. Thus, this screen 29 is visible to a user sitting on the saddle 26.

The saddle 26 comprises a chassis 262 attached to the seat post 27, thus mounted to the frame 22 through the seat post. The saddle 26 also comprises two saddle parts, namely a left saddle part 264 and a right saddle part 266. The saddle further comprises articulation members for each saddle relative to the chassis 262. These articulation members comprise a cradle 267 for articulating the saddle parts, each independently of the other saddle part, about a pitch axis A26 defined by the cradle 267. The cradle 267 is itself supported by an elastically deformable element 268 which constitutes another articulation member of the saddle parts. The elastically deformable element 268 is provided to deform elastically during a roll movement R of the cradle 267 about an axis B26 parallel to the forward/rearward direction of the saddle 26. On the other hand, the elastically deformable element 268 is provided to deform elastically during a yaw movement L of the cradle 267 about an axis C26 that is generally vertical and parallel to, or coincident with, a longitudinal axis of the seat post 27. The pitch movements of the saddle parts 264 and 266 are independent of each other, whereas their roll movements R and yaw movements L are the same, since they result from the elastic deformation of the element 268 that is common to them.

Preferably, the technical teaching of WO-A-2013/135697 is applied here.

In a variant, another structure can be provided for the saddle 26, in particular with saddle parts with independent pitch, roll and yaw movements.

The saddle 26 is equipped with two inertial cells. An inertial cell is positioned under each of the saddle parts 264 and 266, with only the cell arranged under the saddle part 266 visible in FIG. 2, with reference 30. This reference is used to designate each of these two cells.

Each inertial cell 30 is capable of detecting accelerations along three axes of an orthogonal reference frame X-Y-Z of a space in which the apparatus 2 is installed. Thus, each inertial cell 30 is capable of providing three acceleration components Ax, Ay and Az, parallel to the X, Y and Z axes respectively, and three rotation components Gx, Gy and Gz, about these axes. Each inertial unit 30 operates at a frequency of 100 Hz.

In practice, each inertial cell 30 can be formed by an electronic card marketed by the company NXP under the reference BRKT-STBC-AGM01, which integrates two types of inertial sensors, namely a FXOS8700 accelerometer-magnetometer and a FXPS21002 gyrometer. Here, the magnetometer function of the FXOS8700 component is not used. In other words, this magnetometer is not active.

In a variant, other types of inertial cells can be used.

The components Ax, Ay, Az, Gx, Gy, and Gz determined by one of the inertial cells 30 are representing the pitch movement T and roll movement R of the saddle part 264 or 266 under which the inertial cell 30 in question is installed.

The output signals from the two inertial cells 30 are supplied to a calculation unit 40 which comprises, among other things, a microprocessor 41 programmed to perform calculation operations detailed below, as well as a data storage memory 44.

A data link 32 connects each inertial cell 30 to the calculation unit 40 and allows the output signal S30 of the inertial cell 30 in question to be conveyed, this output signal including the components Ax, Ay, Az, Gx, Gy and Gz.

Figure 2:
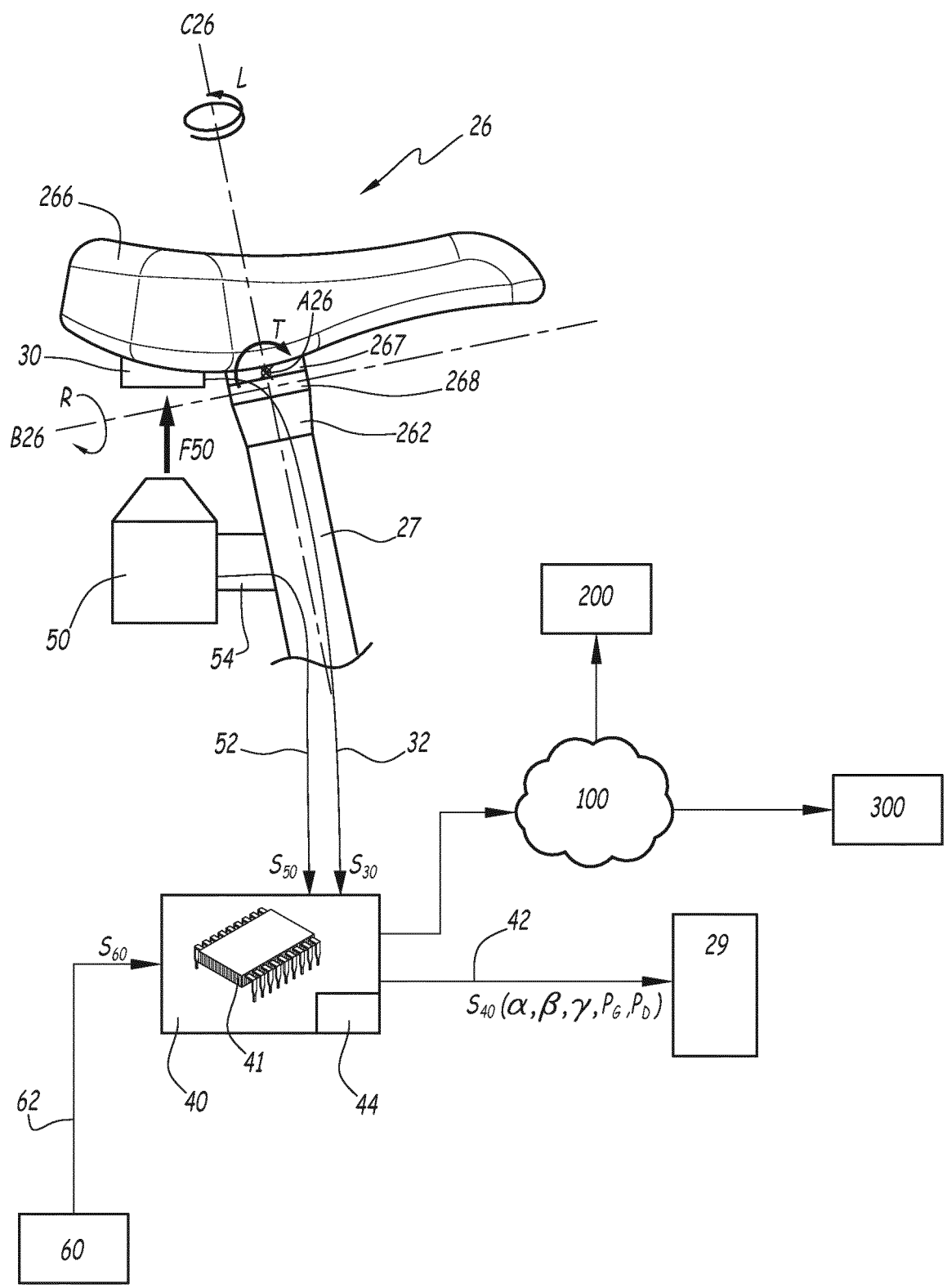
FIG. 2 is a larger scale side view of the saddle and a schematic representation of certain other components of the apparatus of FIG. 1.
Figure 3:
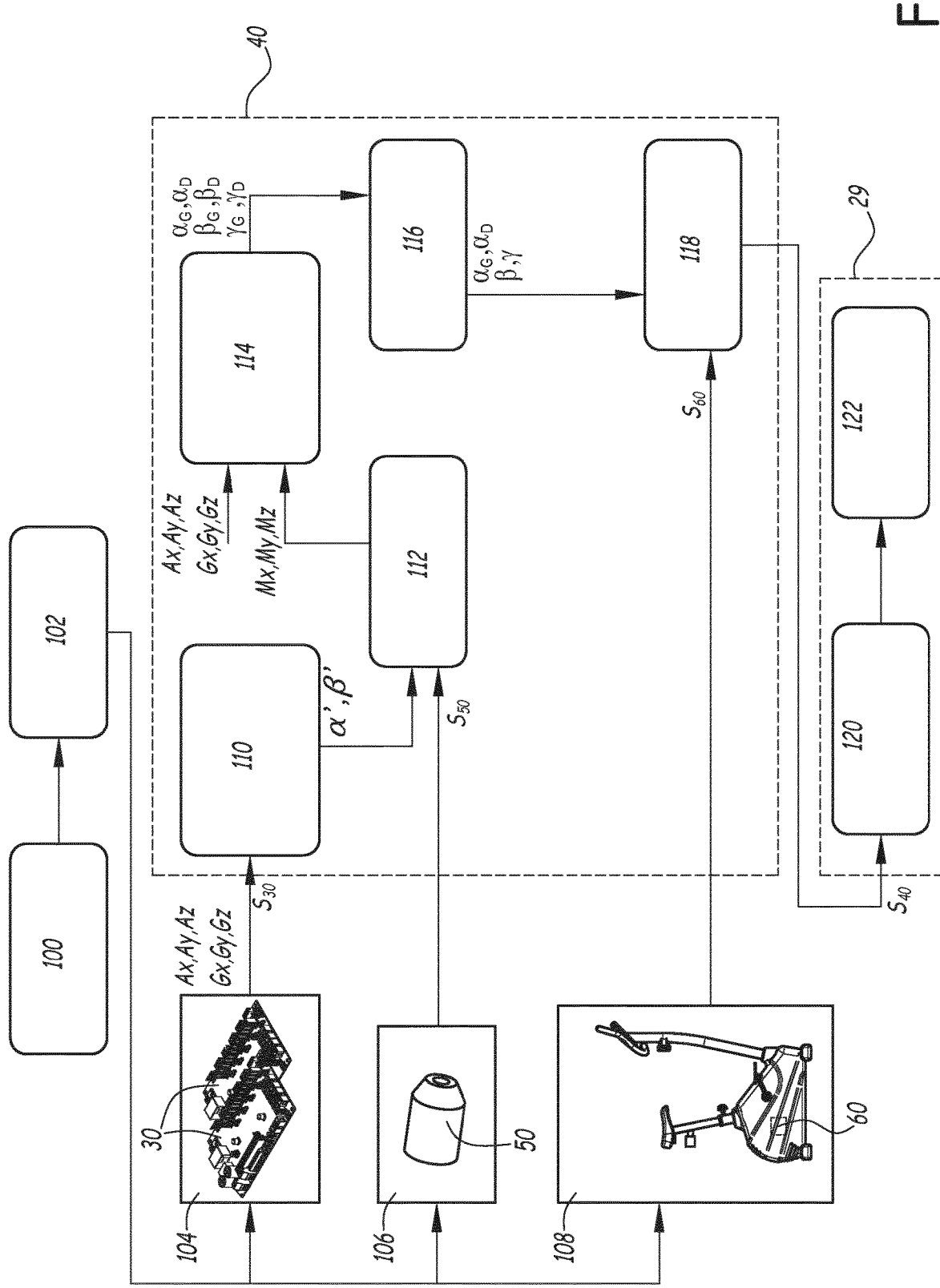
FIG. 3 is a block outline diagram of a method according to the invention.

The apparatus 2 also comprises an optical sensor 50 positioned beneath the saddle 26 and having a viewing direction, shown as arrow F50 in FIG. 2, directed toward the saddle 30 in a direction generally parallel to the axis C26. The optical sensor 50 is used to determine the yaw movement L of the saddle 26 about the axis C26.

To do so, a target, not shown, may be attached underneath the saddle 26, to facilitate aiming the optical sensor 50. The target consists of two marker points, either reflectors or light emitting diodes or LEDS.

The optical sensor 50 is mounted on the seat post 27 by means of a support 54 and connected to the calculation unit 40 by a data link 52 through which the output signal $S_{50}$ of the optical sensor 50 flows, which comprises an angle corresponding to the instantaneous deviation of the saddle 26 about the axis C26, relative to a rest position, and/or the angular amplitude γ of the yaw movement L of the saddle 26. The optical sensor outputs signal $S_{50}$ representing the position 2D, that is, the pixel coordinates of the target light points, with reflectors or with LEDS, which it detects.

The optical sensor 50 operates at a frequency of 50 Hz.

In practice, the optical sensor 50 can be of the SEN0158 type marketed by DFRobot.

In a variant, other optical sensor types may be used.

A sensor assembly 60 is integrated into the physical exercise apparatus 2, in the vicinity of the crankset 24 and enables detecting the rotation speed V of the crankset 24, the duration D of the pedaling and the instantaneous power P of the pedaling. This data is collected at a frequency of the order of 1 Hz, in order to verify in particular that the speed V and the power D are not too high in the context of a relaxation exercise that aims to increase the mobility of a user's pelvis. The sensor assembly 60 also comprises a sensor, not shown and which may be worn by the user, for determining the user's heart rate F while pedaling.

The sensor assembly 60 is connected to the calculation unit 40 by a data link 62 that allows the output signal S60 of this sensor assembly to be conveyed, this output signal including the quantities V, D and P.

It is noted that, even if inertial units incorporating a magnetometer, including the one mentioned above as an example, are known in the literature, the use of a magnetometer is not preferred in the embodiment of the invention represented in the Figures, because a magnetometer is subject to electromagnetic disturbances that may distort the result of the measurements. Since such disturbances are capable of occurring in the area where the apparatus 2 is installed, especially because the user or the person assisting him/her, in particular a caregiver or a trainer, may be carrying a cell phone or other electronic device. In addition, some users may have a metal hip prosthesis fitted, which that constitutes a relatively large ferromagnetic mass positioned in the vicinity of the saddle 26 that may interfere with the operation of a magnetometer. In contrast, the angular amplitude γ of the yaw movement L is relatively small, typically less than 15°, to the point that an absolute error of a few degrees on the measurement of this angle would induce a large relative error.

Using the optical sensor 50 to supplement the measurement of the yaw movement L relative to the measurement of the pitch T and roll R movements, obtained by the inertial cells 30, avoids the drawbacks arising from the electromagnetic disturbances of a magnetometer.

However, if the room in which the exercise apparatus 2 is installed can be protected against electromagnetic disturbances and if those present in this room are not carrying electromagnetic devices or a significant ferromagnetic mass, the use of inertial cells with an active magnetometer can be envisaged, instead of the optical sensor 50.

The calculation unit 40 is connected to the screen 29 by a wired data link 42 over which the output signal $S_{40}$ of the calculation unit 40 circulates. This output signal comprises information for the user to view on the screen 29 while sitting on the saddle 26.

The signal $S_{40}$ also includes information, which may be the same or different from that displayed on the screen 29, for the person assisting the user. In this regard, the signal S40 may be sent via a wireless data link, such as a radio link, including by means of a wireless network 100, such as a Wi-Fi network or a Bluetooth network, to a cell phone 200 or a laptop 300. The cell phone 200 or the computer 300 can be those of the person assisting the user, or even those of the user. These two items can be used to display and store the data received from the calculation unit 40, for analysis after an exercise session on the apparatus 2. This data can also be stored in the memory 44.

To the extent that they are used with the apparatus 2, the cell phone 200 and the computer 300 are considered to be display screens for the apparatus 2, although this is not their sole function, unlike the screen 29.

In the example, the calculation unit consists of an electronic card. In a variant, the calculation unit 40 consists of several physical units distributed throughout the apparatus 2. In practice, the unit 40 may be located under the cover 25 or on the back of the screen 29

The distance between the unit 40 and the sensors should be as short as possible. Rather than a unit 40 located far from the saddle 26 and the sensors 30 and 50, a unit 40 located close by is preferred. The position under the cover 25 is therefore only an example.

During an exercise session of an user on the apparatus 2, the various electronic components mentioned above are started in a first step 100, then the user starts pedaling and keeps pedaling for the duration of the exercise, in a subsequent step 102.

In a step 104 subsequent to the start of step 102, each inertial cell 30 is used to detect the pitch T and roll R movements of the saddle 264 or 266 under which it is installed, about the axes A26 and B26, respectively, and to send the signal $S_{30}$ that comprises the components Ax, Ay, Az, Gx, Gy, and Gz to the calculation unit 40.

In parallel to step 104, a step 106 is implemented by means of the optical sensor 50, to detect the yaw movement L and to send the signal $S_{50}$ that comprises the yaw angle detected by the optical sensor 50 to the calculation unit 40.

Still in parallel to step 104, another step 108 is implemented to detect the parameters V, D and P by means of the sensor assembly 60, which then outputs the signal $S_{60}$.

The calculation unit 40 is configured to receive the signals $S_{30}$, $S_{50}$ and $S_{60}$ and implement several calculation steps by means of the microprocessor 41.

In a first calculation step 110, a Madgwick algorithm is implemented to determine quaternions representing approximate values of the angular amplitudes of the pitch T and roll R movements.

The angular amplitude of the pitch movement T is denoted α and the angular amplitude of the roll movement R is denoted β. The approximate values of the angular amplitudes of pitch and roll determined in step 110 are denoted α' and β', respectively.

The Madgwick algorithm used in this step is described in Sebastian Madgwick's paper "*An efficient orientation filter for inertial and inertial/magnetic sensor arrays*" dated Apr. 30, 2010 and in the paper by Sebastian Madgwick et al. entitled "*Estimation of IMU and MARG orientation using a gradient descent algorithm*" (2011 IEEE International Conference on Rehabilitation Robotics—Rehab Week Zurich, June 29-Jul. 1, 2011).

In this case, the Madgwick algorithm is used with six input parameters.

After step 110, a step 112 is implemented in which the value of the angle detected by the optical sensor 50 is converted into three components Mx, My and Mz, equivalent to the output signals of a magnetometer. The conversion step 112 is performed using the approximate values α' and β' of the pitch and roll angles as correction variables for the yaw angle detected by the optical sensor 50 and which is incorporated into the signal $S_{50}$. In this step 112, the microprocessor 41 uses a rotation matrix to convert the data from the optical sensor 50 into data of the Mx, My, and Mz type.

The conversion algorithm used in step 112 comprises the implementation of a rotation matrix of the type:

$$R_{xyz}(\hat{x}'', \alpha; \hat{y}', \beta; \hat{z}, \gamma) = \begin{bmatrix} c\gamma c\beta & c\gamma s\beta s\alpha - s\gamma c\alpha & c\gamma s\beta c\alpha + s\gamma s\alpha \\ s\gamma c\beta & s\gamma s\beta s\alpha + c\gamma c\alpha & s\gamma s\beta c\alpha - c\gamma s\alpha \\ -s\beta & c\beta s\alpha & c\beta c\alpha \end{bmatrix}$$

The definition of this rotation matrix is accessible via the following link:

http://doucets.free.fr/Matrice_de_Rotation/rotations_intro_doc.html

This matrix has been simplified and adapted to the problem of the 3D articulated saddle. It is then expressed in the following form:

$$\begin{pmatrix} \cos(\text{angle}) & 0 & 0 \\ \sin(\text{angle}) & 0 & \sin(\text{roll}) \\ 0 & 0 & \cos(\text{pitch}) * \cos(\text{roll}) \end{pmatrix}$$

After step 112, a step 114 is implemented during which a Madgwick-type algorithm is again used, this time with nine input parameters, namely the quantities Ax, Ay, Az, Gx, Gy and Gz, Mx, My and Mz. This version of the Madgwick algorithm is thus more elaborate than the one used in step 110 where only six input parameters are used. In this step, the algorithm makes it possible to determine quaternions and, on this basis, to calculate the Euler angles of the movements of the saddle parts.

At the end of step 114, the angular amplitudes $\alpha$, $\beta$ and $\gamma$ of the pitch movements.

The computational frequency of step 110 may be equal to the frequency of step 104, or 100 Hz. The frequency of steps 112 and 114 is to equal 100 Hz. In a variant, it may be equal to the frequency of step 106, or 50, roll and yaw are calculated. Hz.

Steps 110, 112 and 114 are performed in duplicate to recover quantities representing the three movements, pitch R, roll R and yaw L of each saddle part 264 or 266. Six angle values representing the angular amplitudes of these movements are thus obtained, namely the angle $\alpha_G$ of pitch of the left saddle part 264;
the angle $\alpha_D$ of pitch of the right saddle part 266;
the angle $\beta_G$ of roll of the left saddle part 264;
the angle $\beta_D$ of roll of the right saddle part 266;
the yaw angle $\gamma_G$ of the left saddle part 264 and
the yaw angle $\gamma_D$ of the right saddle part 266

In this regard, it may be noted that steps 104 and 110 are implemented with a first inertial cell 30 for the left saddle part 264 and with a second inertial cell 30 for the right saddle part 266.

After step 114, a selection step 116 is implemented by the computational unit 40, at a frequency equal to that of step 114, to select four representative angles from the aforementioned six angles. Since the pitch movements T of the saddle parts 264 and 266 are independent, angles $\alpha_G$ and $\alpha_D$ are each selected. Since the roll movements R of the saddle parts are linked, the angles $\beta_G$ and $\beta_D$ can as identical or nearly identical and only one of them and only one of them is selected, which is referred to as $\beta$ in the following. Similarly, as the yaw movements L of the saddle parts are linked, the angles $\gamma_G$ and $\gamma_D$ can be considered as identical or nearly identical and only one of them is selected, which is referred to as $\gamma$ in the following.

After step 116, a step 118 is implemented, in which the signal $S_{40}$ is sent from the calculation unit 40 to the screen 29. This signal $S_{40}$ comprises the selected angles $\alpha_G$, $\alpha_D$, $\beta$, and $\gamma$, as well as the speed V, the duration D, the pedaling power P, and the heart rate F that have been provided by the sensor assembly 60.

Figure 4:
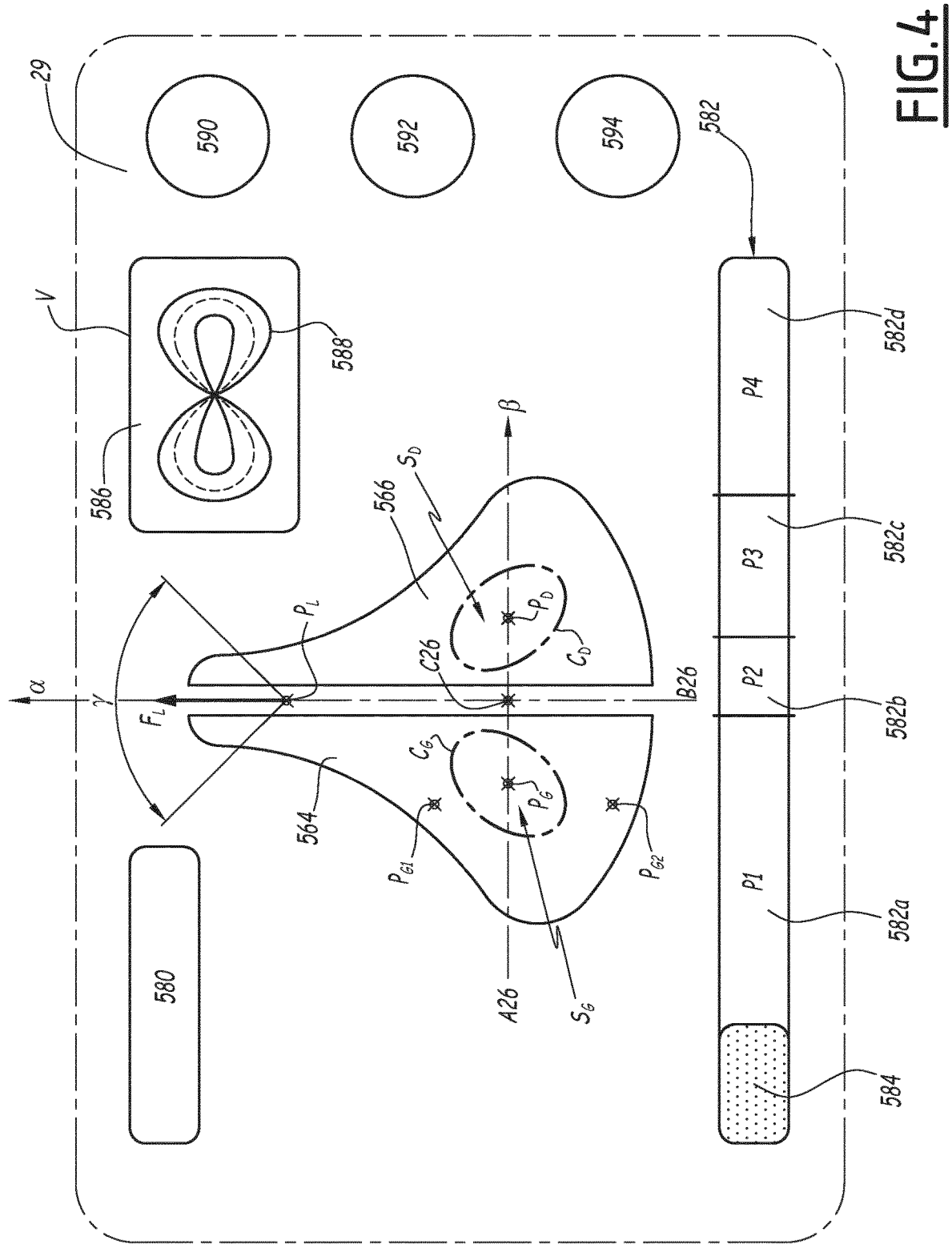
FIG. 4 is a view of a display screen of the apparatus of FIGS. 1 and 2 implementing the method of FIG. 3

The screen 29 receives the signal $S_{40}$ in a step 120 and displays, in a step 122, certain data from this signal $S_{40}$ using a human/machine interface visible in FIG. 4.

On this human/machine interface, two icons 564 and 566 represent the saddle parts 264 and 266, respectively. In this, the icons 564 and 566 form saddle part symbols for the saddle parts 264 and 266 respectively. A text box 580 is used to display a user identifier, such as a first and last name. Buttons 590, 592, and 594 are provided for respectively starting, pausing, or completely stopping the operation of the exercise apparatus 2. The step 100 mentioned above is initiated by pressing the start button 590

A horizontal bar 582 is positioned at the bottom of the screen 29 and is used to display the pedaling time and/or power, in particular by means of a color code. In the example, this pedaling time is represented by a rectangle 584 whose horizontal width increases depending on the time pedaling. Within the bar 582, several areas 582a, 582b, 582c and 582d can be displayed during which different pedaling powers are to be implemented by the user, four pedaling powers P1, P2, P3 and P4 in the example, marked by different colors or in some other way.

A graphic area 586 is used to display a sign 588 whose geometry varies depending on the angles of the pitch T, roll R, and yaw L movements. The sign 588 forms an angular amplitude symbol for angles $\alpha_G$, $\alpha_D$, $\beta$ and $\gamma$, that is, the angles $\alpha_G$, $\alpha_D$, $\beta_G$, $\beta_D \gamma_G$ and $\gamma_D$, since angles $\beta_G$ and $\beta_D$ are the same, as are angles $\gamma_G$ and $\gamma_D$.

The result of the selection step 116 is displayed on the screen 29 in the form of a point $P_G$ of support of the user's left ischium on the saddle 264, as well as a point $P_D$ of support of the of the user's right ischium on the saddle 566.

Specifically, the graphical interface of the screen 29 is designed such that the x-axis, which is coincident with the axis A26 in the embodiment of FIG. 4, represents the value of the roll angle $\beta$, while the y-axis, which is coincident with the axis B26 in the embodiment of FIG. 4, represents the value of the left and right pitch angles $\alpha_G$ and $\alpha_D$.

Thus, it is possible to display the point $P_G$ depending on the values of the angles $\alpha_G$ and $\beta$ in the A26 and B26 axis frame and the $P_D$ point depending on the values of the angles $\alpha_D$ and $\beta$ in the same frame.

In practice, the support of a user's ischia on the saddle parts 264 and 266 is not ad hoc, but is distributed over a relatively small area, less than a few cm². The bearing point of an ischium is defined as the center of such an area.

Ideally, the bearing point $P_G$ is inscribed inside a curve $C_G$ that delimits an area corresponding to a correct positioning of the left part of the user's pelvis on the saddle part 264. This curve $C_G$ is materialized on the screen 29 by a dashed line within the icon 564. Similarly, a curve $C_D$ defines an area within the icon 566, in which the point $P_D$ should normally be located. The areas $S_G$ and $S_D$ enclosed by the curves $C_G$ and $C_D$ on the screen 29 define the locations of acceptable reference positions for the points $P_G$ and $P_D$. The definitions of the curves $C_G$ and $C_G$ and the surfaces $S_G$ and $S_D$ can be stored in the memory 44, allowing the unit 40 to determine possible deviation between the position of each bearing point, $P_G$ or $P_D$, and a corresponding reference position, that is, a point on the surface $S_G$ or $S_D$. The screen 29 is configured to show this deviation by displaying the relative position of the points $P_G$ and $P_D$ and the surfaces $S_G$ and $S_G$.

In FIG. 4, the point $P_{G1}$, located outside the surface $S_G$, corresponds to the case where the user is too far forward on the saddle 26, which results in the pitch amplitude being too large. This leads to a risk of sliding forward, which calls for adjustment of the saddle's backward movement.

The point $P_{G2}$, also located outside the surface $S_G$, represents the case where the user is too far back, which results in the pitch being too little. This leads to insufficient movement, or not optimal for good physiological movement, and calls for adjustment of the position of the person on the bike with the backward or height of the saddle.

It is also possible to consider the case where the support points $P_G$ and $P_D$ are not arranged symmetrically in relation to the space defined between the saddle parts 264 and 266, which can be seen on icons 564 and 566 due to a lack of symmetry in the positioning of these points $P_G$ and $P_D$ on the screen 29. This lack of symmetry in the positioning must be corrected because it induces leads to insufficient movement, or not optimal for good physiological movement, and calls for the person to center him/herself correctly on the seat.

Thus, assuming that the curves $C_G$ and $C_D$ are permanently displayed on the screen 29, in particular as part of the icons 564 and 566, it is possible for the user looking at the screen 29 located in front of him/her to identify whether his/her support points $P_G$ and $P_D$ are correctly located and, if necessary, to correct his/her posture, in an intuitive way, by moving on the saddle part, possibly being guided by the person assisting him/her The position of the points $P_G$ and $P_D$ in a horizontal direction in FIG. 4, that is, parallel to the axis A26, has an influence on the angular amplitude $\beta$ of the roll movement R. The closer the points $P_G$ and $P_D$ are to the space between the saddle parts, that is, to the axis B26, the greater the roll movement R. Note that the spacing between the points $P_G$ and $P_D$ is a result of the user's anatomy and cannot be modified.

The human/machine interface also comprises a representation of the yaw movement L, in the form of an arrow $F_L$ that oscillates around the axis B26, with an angular amplitude that is a function of the value of this angle. To facilitate visualization of the arrow $F_L$, the point of articulation $P_L$ of this arrow on the screen 29 is offset, along the axis B26, from the axis C26. This allows the arrow $F_L$ to be not located in the same part of the icons 564 and 566 as the curves $C_G$ and $C_D$.

In contrast, the sign 588 is developed based on the parameters calculated by the unit 40 in the step 116.

Figure 5:
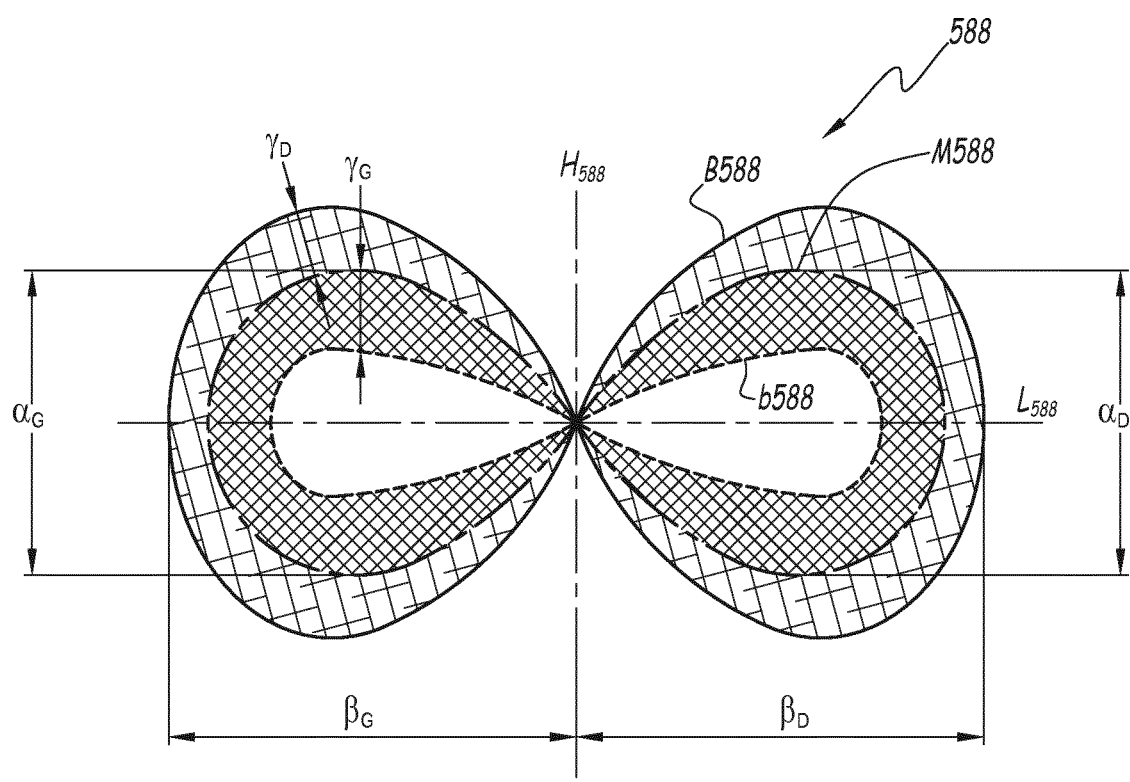
FIG. 5 is a larger scale view of detail V in FIG. 4.

As seen in FIG. 5, the sign 588 is two-dimensional and extends, in width, parallel to an axis L588 and, in height, parallel to an axis H588. Conventionally, the width of the part of the sign 588 to the left of the axis H588 can be taken to represent the quasi-instantaneous value of the roll angle $\beta G$ observed for the left saddle part 264. Similarly, the width of the part of the sign 588 to the right of the H588 axis represents the quasi-instantaneous roll angle $\beta_D$ of the right saddle part 266. "Quasi-instantaneous" means that the roll angle values are averages of the last values taken, for example, the last 10 positions.

The median M588 of the sign 588 is defined as a curve equidistant from its inner edge b588 and its outer edge B588.

Conventionally, the height between the end points of the median M588 in the left part of the sign 588 can be taken to represent the average value $\alpha_G$ of the pitch angle of the left saddle part 264, while the same distance in the right part of the sign 588 represents the average value $\alpha_D$ of the pitch angle of the right saddle part 266. L588. The averages used for the pitch angle values are calculated over the last 10 values, over values since the beginning of the session, or according to any other suitable calculation rule.

Conventionally, the distance between the median M588 and the inner edge b588 may also be considered to represent the average value $\gamma_G$ of the yaw angle of the left saddle 264, while the distance between the median M288 and the outer edge B588 represents the average value $\gamma_D$ of the yaw angle of the right saddle part 266. The average used for the yaw angles is done in the same way as for the pitch angles, or in another suitable way.

The person skilled in the art will then understand that the particular way of displaying the angular amplitude(s) $\alpha$, $\beta$, $\gamma$ is a second aspect of the invention which is distinct from a first aspect of the invention corresponding to the detection of the movement(s) among the pitch T, roll R and yaw L movements, and the associated determination of the angular amplitude(s) $\alpha$, $\beta$, $\gamma$.

In particular, this second aspect of the invention comprises determining a single symbol 588 representing a plurality of angular amplitudes $\alpha$, $\beta$, $\gamma$, with each angular amplitude $\alpha$, $\beta$, $\gamma$ corresponding to a respective dimension of said symbol.

As an optional addition, the single symbol 588 determined represents a plurality of angular amplitudes $\alpha$, $\beta$, $\gamma$ of each of the two saddle parts 264, 266, with the single symbol broken down into separate first and second parts, with the first part corresponding to the left saddle part 264 and the second part corresponding to the right saddle part 266. To facilitate user interpretation of the displayed quantities, the first and second parts are preferably arranged on opposite sides of a reference axis, such as the H588 axis, with the first part to the left of the reference axis, for example, and the second part to the right of said reference axis.

As a further optional addition, at least two angular amplitudes $\alpha$, $\beta$ each correspond to a dimension of said symbol along a respective direction, distinct from one angular amplitude $\alpha$, $\beta$ to the other. In the example of FIG. 5, the representation of the angular amplitude $\beta_G$, $\beta_D$ of the roll movement R of each saddle part 264, 266 corresponds to a dimension of the symbol 588 along a horizontal direction, that is, parallel to the L588 axis, and the representation of the angular amplitude $\alpha_G$, $\alpha_D$ of the pitch movement T of each saddle part 264, 266 corresponds to a dimension of the symbol 588 along a direction perpendicular to the direction associated with the roll movement R, such as a vertical direction, that is, parallel to the H588 axis.

In the example described above, a single sensor 50 is used to measure the yaw angle $\gamma$, considering that the saddle parts 264 and 266 are integral in rotation about the C26 axis, and the values of the angles $\gamma_G$ and $\gamma_D$ are then identical, which corresponds to the fact that the curve $M_{588}$ is the median of the sign 588. However, it could be otherwise, with an optical sensor under each saddle part 264, 266 in particular, according to the following variant.

In order to easily identify the position of the median M588, the parts of the sign 588 positioned on either side of this median may be colored differently.

The display of the sign 588 on the screen 29 allows the user to verify that the movements of each saddle part 264 and 266 are regular and harmonious, that is, noticeably smooth. The symmetry of the sign 588 with respect to the axes L588 and H588 also allows the user to ensure that the saddle movements are balanced. In practice, the geometry of the 588 sign is comparable to that of the "infinity" sign. An indication of the smoothness and compliance of the pedaling movement, with respect to a preset exercise program, may be that the shape of the sign 588 is close to that of the "infinity" sign.

According to an embodiment of the invention not shown, an optical sensor may be positioned under each saddle part 264 and 266, which then allows the respective yaw movements of the two saddle part to be determined independently of each other. The calculation steps 110 to 118 and display step 122 are then adapted.

In the aforementioned case where the inertial cells have an active magnetometer, instead of the optical sensor, the calculations performed in cell 40 are adapted. The steps 110 and 112 are omitted and the step 114 is performed directly from the output signals of the inertial cells 30.

The values of the amplitudes α, β and γ of the pitch, roll and yaw angles, calculated in step 114, can be stored in the memory 44 as well as in the memories of the devices 200 and 300, if necessary. It is thus possible to observe the variations of these values during a physical exercise session on the apparatus 2 and to compare these values during successive physical exercise sessions on this apparatus, or even during the same session. The invention thus makes it possible to monitor the user's performance.

It is also possible to store the values V, P, F and D for an exercise session or, more precisely, a table giving the values of the speed V, the power P and the heart rate F depending on the time D elapsed since the start of the session, which makes it possible to evaluate changes in a user's pace and effort during a session. Again, this allows for tracking of a user's progress.

Preferably, the sign 588 is obtained by incorporating the amplitudes of the pitch T, roll R, and yaw L movements over a period of use of the device, such as during an exercise session.

Instead of the Madgwick algorithm mentioned above, it is possible to use other algorithms of comparable types for steps 110 and 114, including a Mahony algorithm. Likewise for the algorithms for the steps of inversion 112, or another type of rotation matrix can be used, and of selection 116, or another selection can be made, for example based on an average of the values of the angles $β_G$ and $β_D$, on the one hand, $γ_G$ and $γ_D$, on the other hand.

The data links 32, 42, 52 and 62 are wired links, for example, or, in a variant, wireless links, such as radio links.

According to an embodiment of the invention not shown, the screen 29 may be omitted and the human/machine interface for displaying the support points $P_G$, $P_D$ takes place only on a screen of an ancillary hardware, such as the screen of a telephone 200 or of a computer 300, or any other screen of a user terminal which is then considered to be part of the physical exercise apparatus 2.

The embodiment and variants contemplated above may be combined to generate new embodiments of the invention.

The invention claimed is:

1. A physical exercise apparatus comprising:
   a frame equipped with:
     a crankset; and
     a saddle comprising:
       a chassis fastened to the frame;
       two saddle parts; and
       members for articulating each of said two saddle parts with respect to said chassis, about a pitch axis, about a roll axis, and about a yaw axis;
   sensors detecting a pitch movement, a roll movement, and a yaw movement of each of said two saddle parts about the pitch, roll and yaw axes, respectively, these movements resulting from pedaling by a user, wherein said sensors comprise at least one inertial cell attached to each of said two saddle parts;
   a calculation unit determining angular amplitudes of the pitch, roll and yaw movements, from output signals from said sensors; and
   a screen displaying a position, on each of said two saddle parts, of a bearing point of a user's ischium while pedaling, the bearing points depending on the angular amplitudes determined by said calculation unit.

2. A method for training a user on a physical exercise apparatus, comprising:
   providing the physical exercise apparatus according to claim 1;
   detecting the pitch and roll movements by the at least one inertial cell of the physical exercise apparatus;
   detecting the yaw movements by an optical sensor of the physical exercise apparatus;
   determining the angular amplitudes of the pitch, roll and yaw movements, comprising:
     calculating pitch and roll amplitude values, based on vector components of the pitch and roll movements determined by said at least one inertial cell;
     calculating vector components corresponding to a magnetometer output signal, based on an output signal of the optical sensor and the pitch and roll amplitude values calculated by said calculating the pitch and roll amplitude values; and
     calculating the pitch, roll and yaw amplitude values; and
   displaying on the screen of the physical exercise apparatus positions of bearing points of the user's ischium, the bearing points depending on the angular amplitudes determined by the calculation unit of the physical exercise apparatus.

3. The method according to claim 2, wherein said displaying comprises displaying on the screen of the physical exercise apparatus the angular amplitudes determined by said determining the angular amplitudes of the pitch, roll and yaw movements.

4. The method of claim 3, further comprising:
   determining a single symbol representing the angular amplitudes, with each angular amplitude corresponding to a respective dimension of the single symbol; and
   displaying the single symbol on the screen of the physical exercise apparatus.

5. The method according to claim 2, wherein said calculating the pitch and roll amplitude values uses a 6-axis Madgwick algorithm.

6. The method according to claim 2, wherein said calculating the pitch, roll and yaw amplitude values uses a 9-axis Madgwick algorithm.

7. The physical exercise apparatus according to claim 1, wherein said at least one inertial cell detects the pitch and roll movements, and wherein at least one optical sensor is used to detect the yaw movement of each of said two saddle parts.

8. The physical exercise apparatus according to claim 1, wherein said calculation unit is configured to determine a deviation between the position of each bearing point on each of said two saddle parts and a reference position, and wherein said screen displays this deviation.

9. The physical exercise apparatus according to claim 1, wherein said screen is positioned in front of the user sitting on said saddle.

10. The physical exercise apparatus according to claim 1, wherein said screen is positioned on a handlebar of the apparatus.

11. A method for training a user on a physical exercise apparatus, comprising:
   providing the physical exercise apparatus according to claim 1;
   detecting the pitch, roll and yaw movements by means of the sensors of the physical exercise apparatus;
   determining the angular amplitudes of the pitch, roll and yaw movements; and
   displaying on the screen of the physical exercise apparatus positions of bearing points of the user's ischium, the bearing points depending on the angular amplitudes determined by the calculation unit of the physical exercise apparatus, wherein the calculation unit of the physical exercise apparatus determines a deviation between a position of the users' ischium bearing point on each of said two saddle parts of the saddle of the physical exercise apparatus and a reference position, wherein the screen of the physical exercise apparatus displays this deviation, and wherein said displaying comprises displaying on the screen a representation of the two saddle parts of the physical exercise apparatus, the user's ischium bearing positions relative to the representation of the two saddle parts, and a representation of the reference position relative to the representation of the two saddle parts.

\* \* \* \* \*